United States Patent
Chaloupka et al.

(10) Patent No.: US 11,290,350 B2
(45) Date of Patent: Mar. 29, 2022

(54) DISTRIBUTED SAGA EXECUTION AND COORDINATION

(71) Applicant: Red Hat, Inc., Raleigh, NC (US)

(72) Inventors: Ondrej Chaloupka, Brno (CZ); Martin Stefanko, Brno (CZ)

(73) Assignee: Red Hat, Inc., Raleigh, NC (US)

(*) Notice: Subject to any disclaimer, the term of this patent is extended or adjusted under 35 U.S.C. 154(b) by 302 days.

(21) Appl. No.: 16/248,408

(22) Filed: Jan. 15, 2019

(65) Prior Publication Data
US 2020/0228418 A1 Jul. 16, 2020

(51) Int. Cl.
| H04L 41/50 | (2022.01) |
| H04L 67/10 | (2022.01) |
| G06F 9/46 | (2006.01) |
| G06F 9/44 | (2018.01) |
| G06Q 10/02 | (2012.01) |
| G06F 16/23 | (2019.01) |

(52) U.S. Cl.
CPC ............. *H04L 41/50* (2013.01); *G06F 9/44* (2013.01); *G06F 9/466* (2013.01); *G06F 16/2358* (2019.01); *G06Q 10/02* (2013.01); *H04L 67/10* (2013.01)

(58) Field of Classification Search
None
See application file for complete search history.

(56) References Cited

U.S. PATENT DOCUMENTS

| 9,747,153 B2* | 8/2017 | Raghavendra | G06F 11/079 |
| 2007/0150075 A1* | 6/2007 | Dumas | G06F 8/20 700/29 |
| 2016/0124742 A1* | 5/2016 | Rangasamy | H04L 41/0803 717/103 |
| 2018/0109634 A1* | 4/2018 | Lawson | H04M 15/52 |
| 2018/0307514 A1* | 10/2018 | Koutyrine | G06F 11/0706 |
| 2019/0019090 A1* | 1/2019 | Chacko | G06Q 10/06 |

OTHER PUBLICATIONS

Bernd Rücker; "Flowing-retail: Demonstrating aspects of microservices, events and their flow with concrete source code examples." https://blog.bernd-ruecker.com/flowing-retail-demonslaling-aspects-of-microservices-events-and-their-flow-with-concrete-source-7f3abdd40e53; Published on Apr. 4, 2017; retrieved on Sep. 27, 2018 (8 Pages).

(Continued)

*Primary Examiner* — Belix M Ortiz Ditren
(74) *Attorney, Agent, or Firm* — K&L Gates LLP

(57) ABSTRACT

A system includes a distributed saga log, a first service, a second service, a first saga execution coordinator (SEC) instance collocated to the first service, and a second SEC instance collocated to the second service. The first SEC instance is configured to manage a transaction for the first service, access the distributed saga log, perform a task identified in the distributed saga log, and document actions initiated by the first SEC instance in the distributed saga log. The distributed saga log is accessible to the first SEC instance and the second SEC instance. Additionally, the distributed saga log is configured to maintain saga processing information associated with the actions initiated by the first SEC instance and the actions initiated by the second SEC instance.

17 Claims, 11 Drawing Sheets

(56) References Cited

OTHER PUBLICATIONS

Bernd Rücker; "Saga: How to implement complex business transactions without two phase commit." https://blog.bernd-ruecker.com/saga-how-to-implement-complex-business-transactions-without-two-phase-commit-e00aa41a1b1b; Published on Apr. 26, 2017; retrieved on Sep. 24, 2018 (8 Pages).
Catie McCaffrey; "Distributed sagas a protocol for coordinating microservices" https://www.slideshare.net/JontheBeach/distributed-sagas-a-protocol-for-coordinating-microservices; Published on Jun. 6, 2017; retrieved on Sep. 25, 2018 (132 Pages).
Chris Richardson; "Designing Business Logic in a Microservice Architecture" https://freecontent.manning.com/designing-business-logic-in-a-microservice-architecture/; ©2018 Manning Published on Jan. 29, 2018; retrieved on Sep. 25, 2018 (11 Pages).
Yos Riady; "Distributed Sagas for Microservices" https://dzone.com/articles/distributed-sagas-for-microservices; Published at DZone MVB; Published on Feb. 22, 2018; retrieved on Sep. 25, 2018 (28 Pages).

* cited by examiner

DISTRIBUTED SAGA EXECUTION AND COORDINATION

BACKGROUND

Computer systems may run applications or services that are provided via a server or cloud. The applications or services can be developed and deployed as a single unit or as multiple units, such as a collection of microservices. Applications or microservices may run within containers, which may be run on physical or virtual machines. For example, containers may encapsulate a lightweight runtime environment for an application or a microservice. In microservice architectures, containers are replicated across node clusters and network traffic between containers is transferred through and between overlay networks to enable multi-host networking environments.

Transactions associated with the applications or services may include coordinated actions or tasks. Transactions arise in a number of different contexts. For example, business travel, vacation bookings, itinerary planning, and event reservations may involve a transaction with coordinated actions or tasks. For example, booking travel may involve a transaction that requires multiple different parties processing the transaction. A travel agent may request reservations on various flights, hotels, etc. In response to the requests, one or more airline systems may book flight tickets for a traveler. One or more hotel systems may create reservations for the traveler, etc.

SUMMARY

The present disclosure provides new and innovative systems and methods for distributed saga execution and coordination. In an example, a system includes a distributed saga log, a first service, a second service, a first saga execution coordinator (SEC) instance collocated to the first service, and a second SEC instance collocated to the second service. The first SEC instance is configured to manage a transaction for the first service, access the distributed saga log, perform a task identified in the distributed saga log, and document actions initiated by the first SEC instance in the distributed saga log. The distributed saga log is accessible to the first SEC instance and the second SEC instance. Additionally, the distributed saga log is configured to maintain saga processing information associated with the actions initiated by the first SEC instance and the actions initiated by the second SEC instance.

In an example, a method includes collocating a first saga execution coordinator (SEC) instance to a first service, collocating a second SEC instance to a second service, and providing a distributed saga log that is accessible to the first SEC instance and the second SEC instance.

In an example, a method includes creating, by a first saga execution coordinator (SEC) instance, a saga definition including a first action and a second action. The method also includes writing, by the first SEC coordinator, the saga definition in a distributed saga log. Additionally, the method includes initiating and processing, by the first SEC instance, the first action. The method also includes initiating and processing, by the second SEC instance, the second action. Additionally, the method includes finishing, by one of the first SEC instance and the second SEC instance, the saga definition.

Additional features and advantages of the disclosed methods, systems and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
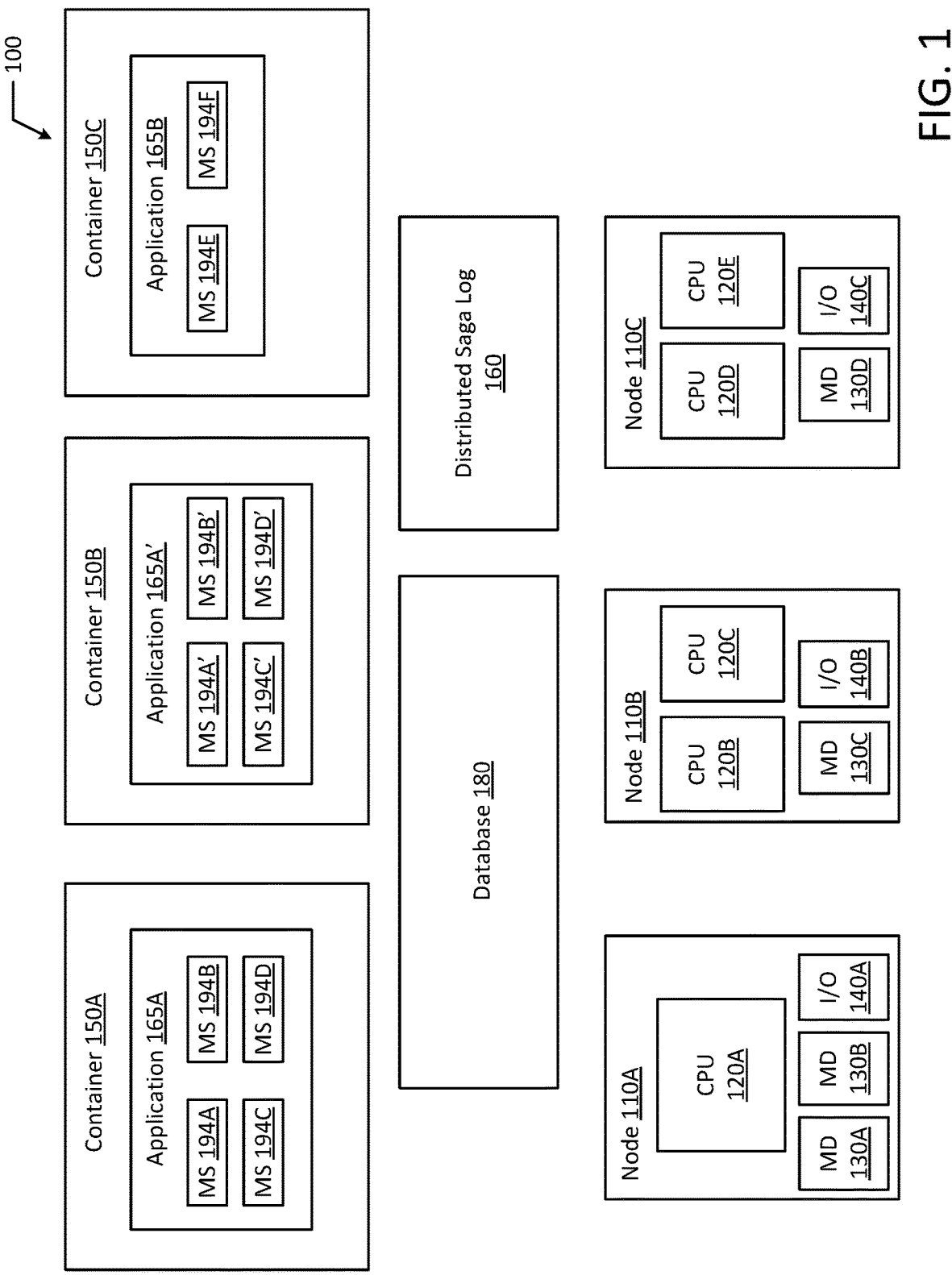
FIG. 1 illustrates a block diagram of an example computing system according to an example embodiment of the present disclosure.

Transactions are an essential part of applications for maintaining data consistency. In an example transaction, such as a two-phase commit transaction, a commit of a first transaction may depend on the completion of a second transaction. For example, confirming an order and updating the stock relative to the purchase all at once. Another type of transaction, for example a saga transaction, is a pattern for a distributed transaction. The saga transaction or "saga" is a sequence of local transactions where each transaction may update data within a single service. For example, a saga is typically a higher-level business process (such as booking a trip) that consists of several low-level requests that each update data within a single service. Typical saga implementations expose a saga execution coordinator ("SEC") as a standalone service. For example, each transaction may be initiated by an external request that is coordinated by the SEC. After a first transaction is completed, the next subsequent transaction may be triggered or initiated.

However, the typical saga implementations (e.g., implementing the SEC as a standalone service) have difficulty scaling and working in microservice environments because of the additional complexity involved in microservice orchestration. For example, coupling or linking the execution of transactions together becomes cumbersome when applying additional steps or microservices, which may make tracking or coupling the additional microservices into the existing architecture difficult. For example, in some cases, cyclic dependencies may exist between services as the services or transactions may have to subscribe to one another's events. Cyclic dependencies become more cumbersome when adding intermediate events or microservices. These problems become more severe as the microservices are scaled, especially in cloud environments where a transaction or application may involve thousands of microservices.

As described in the various example embodiments herein, to improve scalability, techniques are disclosed for distributed saga execution and coordination. For example, a distributed SEC serves as an orchestration component of the saga processing that is spanned across several participants (e.g., services). The SEC may be collocated with the user services as a transaction library that manages transactions. The proposed architecture includes a distributed saga transaction log that is available to each SEC instance. The distributed saga transaction log provides information about the saga processing (e.g., starting, participant invocations, participant completions, saga completion, saga compensation, etc.). During saga processing, different SEC instances may access the log and perform separate tasks or activities depending on various criteria. Additionally, each SEC instance may document its actions in the distributed saga transaction log. In the examples disclosed herein, saga processing may be available until the user application is running. Each SEC instance may provide saga processing to provide a fault tolerant system without a single point of failure. For example, unlike standalone SEC services, which may create a single point of failure, the present disclosure deploys multiple SEC instances that are collocated with the services to handle saga processing. Different SEC instances may access the distributed saga log. Once a service is running, then that instance of the SEC is available. For example, the service and collocated SEC instance may either perform saga processing or specific service tasks or actions. Additionally, if none of the services is able to handle the request, then SEC processing may be stopped, and when a new service instance is refreshed, the refreshed microservice may continue to process actions with a SEC capable of handling saga processing.

Unlike the centrally managed standalone saga coordinators, the distributed SEC instances of the present disclosure scale automatically as the demands on the associated services appear. For example, the amount of work a SEC (e.g., the collective of each SEC instance) is capable of processing may be directly proportional to the amount of work processed by the application logic. Multiple service instances with collocated SECs may be deployed to handle higher network traffic and workloads.

By disseminating the SEC over the various microservices, each microservice may be self-saga capable and thus may be developed and administered in different applications without the scaling difficulties associated with a standalone SEC. For example, a single coordination service like a standalone SEC may be required to maintain all handling rules, which may change and become progressively problematic as the system scales. As discussed above, the handling rules may become more complex as the system scales and managing rule conflicts may consume additional time and resources. A standalone SEC may require additional considerations such as managing an associated database and scaling associated machinery when scaling a standalone SEC. Additionally, as discussed above, a single coordination service requires a separate deployment and may be a failure point in the system.

Additionally, adding a SEC instance (e.g., a lightweight transaction library) to each microservice adds minimal overhead to existing architectures. For example, existing saga architectures may already include data storage (e.g., a SQL database) or an event store (e.g., message broker). These existing components may be utilized by the distributed SEC instances as a store for data belonging to the SEC instances. In an example, the logic of the SEC may be agnostic of the type of data storage or event store in the existing architecture. For example, the SEC may be associated with a data connection adapter that is configured for data transfer between the data storage and the SEC.

The present disclosure is especially advantageous to cloud providers that want to improve scalability, efficiency and robustness of the cloud by eliminating a single point of failure and providing a distributed saga execution coordinator. For example, cloud providers like Red Hat® Cloud Suite may utilize distributed saga execution coordinators (SECs) to allow for improved application and microservice scalability on the cloud for distributed transactions. Additionally, integration platforms and services, such as Red Hat Fuse, which is a distributed, cloud-native integration platform, may incorporate distributed SECs in their deployed services.

FIG. 1 depicts a high-level component diagram of an example computing system 100 in accordance with one or more aspects of the present disclosure. The computing system 100 may include a database 180, a distributed saga log 160, one or more containers 150A-C, and nodes (e.g., nodes 110A-C).

The containers 150A-C may each run a process or service (e.g., microservices 194A-F and microservices 194A'-D'). The containers, hereinafter referred to generally as container(s) 150, may be executed in any execution environment. For example, the containers 150 may operate as a virtual server. It should be appreciated that containers may be stand-alone execution environments, similar to that of a virtual machine. The applications (e.g., applications 165A, 165A' and 165B) or combination of services (e.g., microservices) may run in a software container 150 or a virtual machine. In an example, containers 150A-C may instead be virtual machines that execute applications or services, such as microservices 194.

As illustrated in FIG. 1, applications (e.g., application 165A) and services (e.g., microservices 194A-C) may include multiple instances. For example, application 165A is illustrated as two separate instances (e.g., Application 165A and 165A'). Similarly, services or microservices 194A-D are depicted as two separate instances (e.g., MS 194A-D and MS194A'-D'). The system 100 may include different applications (e.g., application 165B) that are made up of different services (e.g., microservices 194E-F) or a different combination of micro services.

Each service or micro service, hereinafter referred to generally as service 194 may be associated with a SEC (see FIGS. 2A, 2B and 3). The SEC may be collocated with the service 194. For example, the SEC may be a transaction library that manages transactions for the service 194. The services 194 and/or associated SECs may communicate with the distributed saga log 160, which may be stored on a database 180. In an example, the database 180 may be an event store. The services 194 may send or receive information to and from the distributed saga log 160 through coordination of their respective SEC.

Distributed saga log 160 provides information about saga processing to participating services 194. For example, the distributed saga log 160 may store saga definitions that define actions or tasks to be performed by various services 194. Additionally, the distributed saga log 160 may store saga processing information that indicates the status of the saga definitions and/or associated tasks. For example, the saga processing information may include starting saga information (e.g., that a saga definition has been established and the transaction has started), participant invocation information (e.g., that a SEC or service 194 has invoked or taken a task defined by the saga definition), participant invocation completion information (e.g., that a SEC or service 194 has successfully completed a task), participant invocation failure information (e.g., that a task taken by a SEC or service has failed), saga completion information (e.g., that each task in the saga definition has been successfully completed), saga compensation information (e.g., that an "in process" or completed task in a saga definition needs to be canceled or rolled back), and ending saga information (e.g., that the transaction is complete and has ended).

Depending on the information in the distributed saga log 160, SECs and/or associated services 194 may perform or process tasks based on task criteria. For example, some tasks may be dependent on the completion of other tasks. Additionally, some tasks may be associated with a specific service 194. For example, a task to book a car may be completed by car rental or car reservation services 194. SEC(s) and services may be assigned (e.g., receive) tasks or actions based on information in the distributed saga log 160. For example, the distributed saga log 160 may send messages and assign tasks or activities to specific services 194 based on the saga definition and saga processing information. For example, certain services may be adapted to perform specific actions or tasks (e.g., airline services adapted for making flight reservations). Additionally, the saga processing information may dictate how the distributed saga log 160 assigns tasks. For example, tasks that have already been designated as complete in the log may no longer need to be assigned while pending tasks may be assigned to other service instances.

Additionally, the distributed saga log 160 may be configured to restrict access to a task identified in a saga definition from other SEC instances or services 194 when the task is being accessed by a SEC instance or service 194. For example, when a SEC updates the distributed saga log 160 to indicate that a task is in process or completed, other SECs and/or services 194 are prevented from updated the saga processing information associated with that task, which ensures data consistency and accuracy. In an example, even though any participant (e.g., SEC or service 194) may read or write to the distributed saga log 160, SECs and/or services 194 may be restricted from overwriting work done by other participants (e.g., other SECs and/or services 194). A lock may be used to ensure that a single participant is accessing data (e.g., a task or activity) in the distributed saga log 160 at a specific time.

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Containers 150A-C may be provisioned on the same host or node (e.g., node 110A) or different nodes. For example, container 150A and container 150B may both be provisioned on node 110A. Alternatively, container 150A may be provided on node 110A while container 150B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2A:
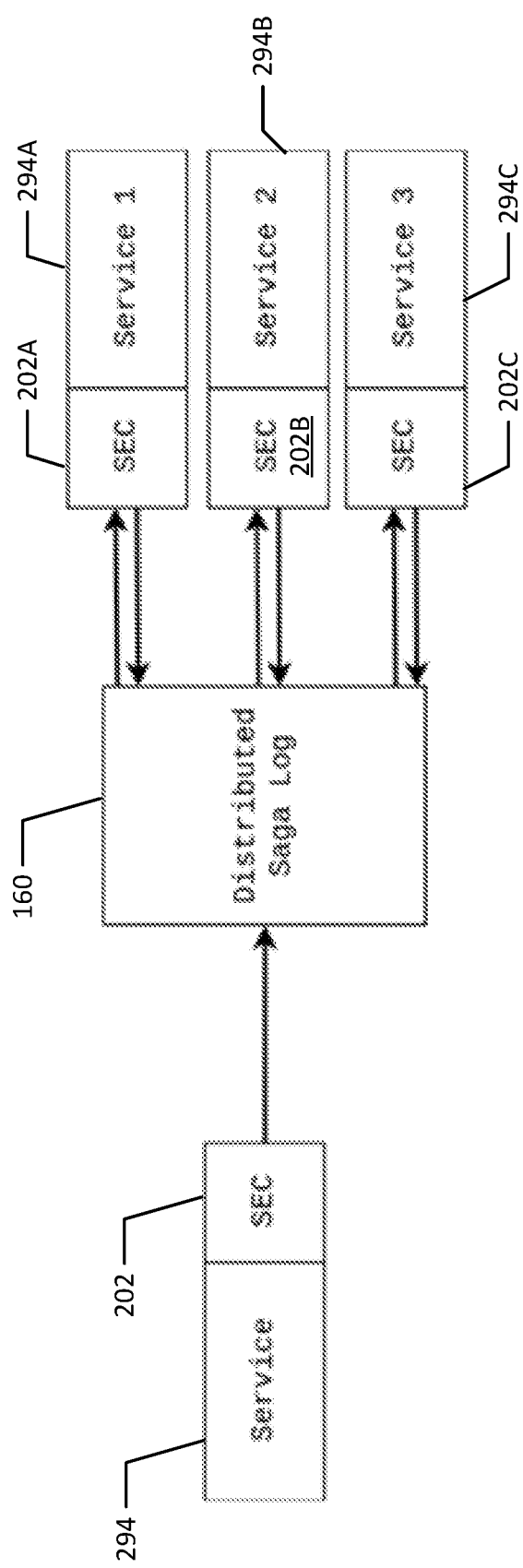
FIGS. 2A and 2B illustrate high-level component diagrams of example distributed saga execution and coordination architectures according to example embodiments of the present disclosure.
Figure 2B:
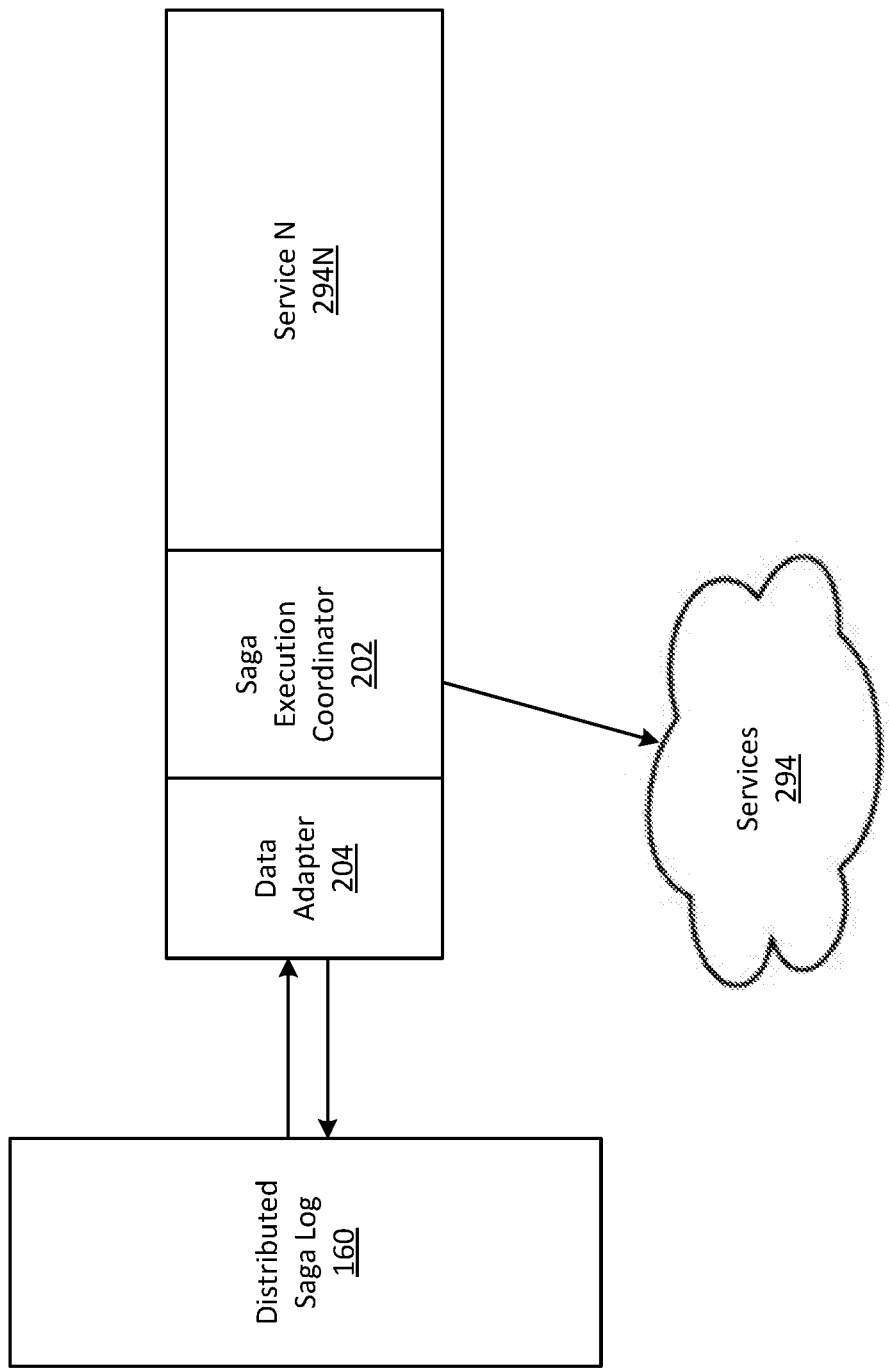

FIGS. 2A-2B depict high-level component diagrams of example distributed saga execution and coordination architectures. In the illustrated example of FIG. 2A, various distributed SEC instances 202A-C (which may also be referred to herein individually or collectively as SEC(s) 202) are collocated with services 294A-C (which may also be referred to herein individually or collectively as service(s) 294). Each of the SEC instances 202 may communicate with a distributed saga log 160.

As illustrated in FIG. 2B, the SEC 202 may be associated with or bound to a data adapter 204. Additionally, each SEC (e.g., SEC 202) may make context calls to other services 294 in the cloud. In an example, when the service 294N (e.g., "Service N") starts, service 294N may pack the dependency of SEC 202 to its runtime. In an example, the SEC 202 may be associated with a data adapter 204. The data adapter 204 may bind an application program interface ("API") of SEC 202 to a particular implementation of the distributed saga log 160. For example, the distributed saga log 160 may be represented by a database 180, a messaging broker or the like. The data adapter 204 serves as a converter of the request that is saved and stored in the distributed saga log 160. Additionally, the data adapter 204 may convert data received from the distributed saga log 160 so that the data is accessible and understood by the SEC 202 bound to the data adapter 204.

Depending on the implementation of the distributed saga log 160, the data adapter 204 may be configured to receive messages or data from the distributed saga log 160. For example, the data adapter 204 may enlist itself as a receiver for messages sent by distributed saga log 160 (e.g., when distributed saga log 160 is a message broker). Additionally, the data adapter 204 may actively poll the distributed saga log 160 for new events (e.g., when the distributed saga log 160 is a database). In an example, receiving messages directly from the distributed saga log 160 without polling is preferable to minimize or eliminate delay of the SEC 202 receiving the message.

Figure 3:
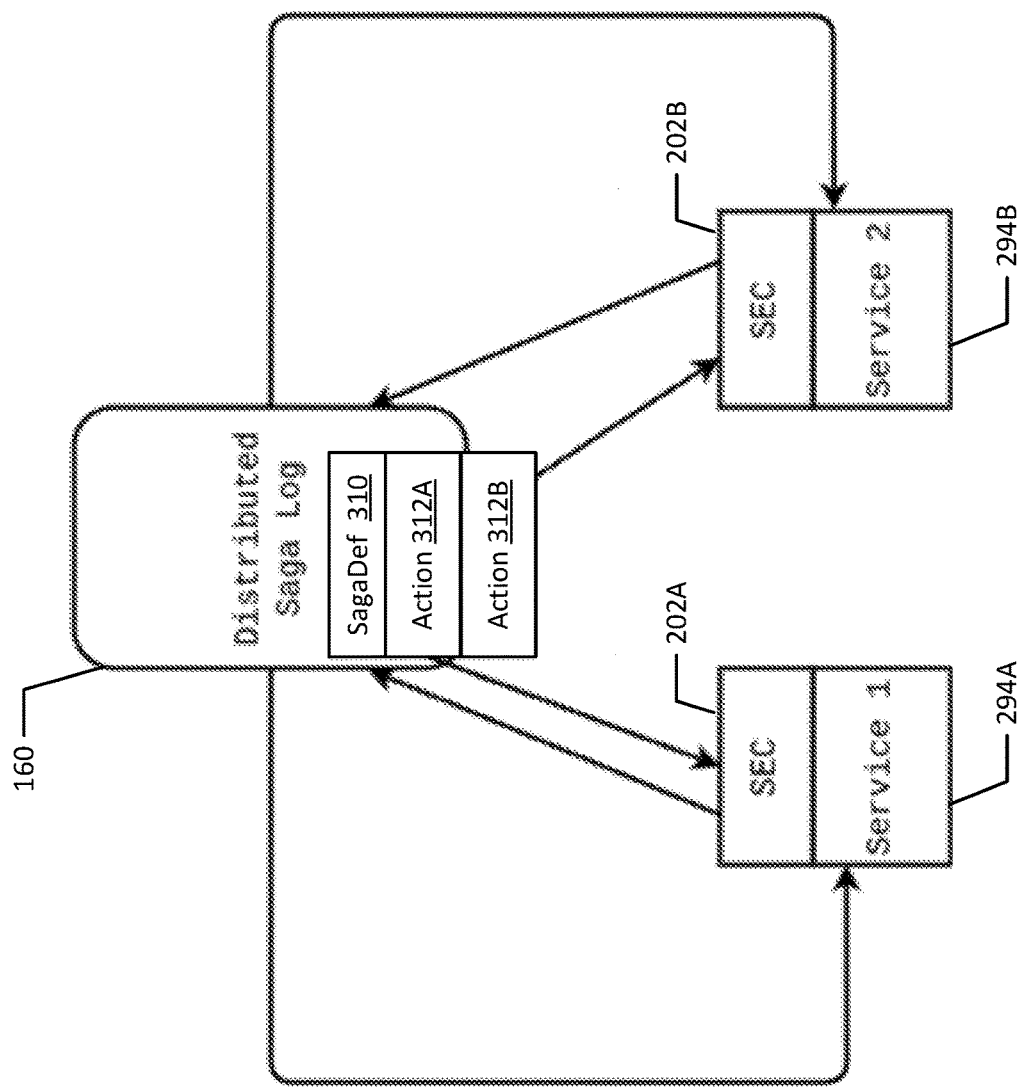
FIG. 3 illustrates a high-level component diagram of an example distributed saga execution and coordination architecture according to an example embodiment of the present disclosure.

FIG. 3 depicts a high-level component diagram of an example distributed saga execution and coordination architecture. In the illustrated example, service 294A may create a saga definition 310 and pass the saga definition 310 to the distributed saga log 160. The saga definition 310 may define various actions (e.g., actions 312A-B). In the example, action 312A may be an action associated with service 294A (e.g., action 312A to be invoked against service 294A). Similarly, action 312B may be an action associated with service 294B (e.g. action 312B to be invoked against service 294B). After the saga definition 310 is registered in the distributed saga log 160, SEC 202A may take action 312A. In another example, the distributed saga log 160 may provide SEC 202A with action 312A. Then, SEC 202A processes action 312A.

Next, SEC 202B may take action 312B or may be provided action 312B by the distributed saga log 160. After receiving action 312B, SEC 202B may process action 312B. After processing action 312B, which is the last remaining action 312 in the saga definition 310, the SEC 202B may finish the saga definition 310. For example, SEC 202B may observe that each of the actions 312A-B have been processed and that the saga definition 310 is unfinished. After successfully finishing the saga, completion callbacks may be called.

It should be appreciated that either SEC instance 202A-B may finish the saga definition 310. For example, any participant (e.g., service 294 and associated SEC 202) may manage saga completion and/or compensation (including callbacks). Additionally, actions 312A-B may occur consecutively, simultaneously, in parallel or in a different order. For example, while SEC 202A is processing action 312A, SEC 202B may also be processing action 312B in parallel. In another example, SEC 202B may process action 312B prior to SEC 202A taking or processing action 312A. However, to prevent data disparities, preferably only a single SEC instance accesses the saga definition 160 at a time. In an example, locks may be implemented to prevent other participants from writing to an entry in the distributed saga log 160 while it is being accessed by another participant.

Figure 4:
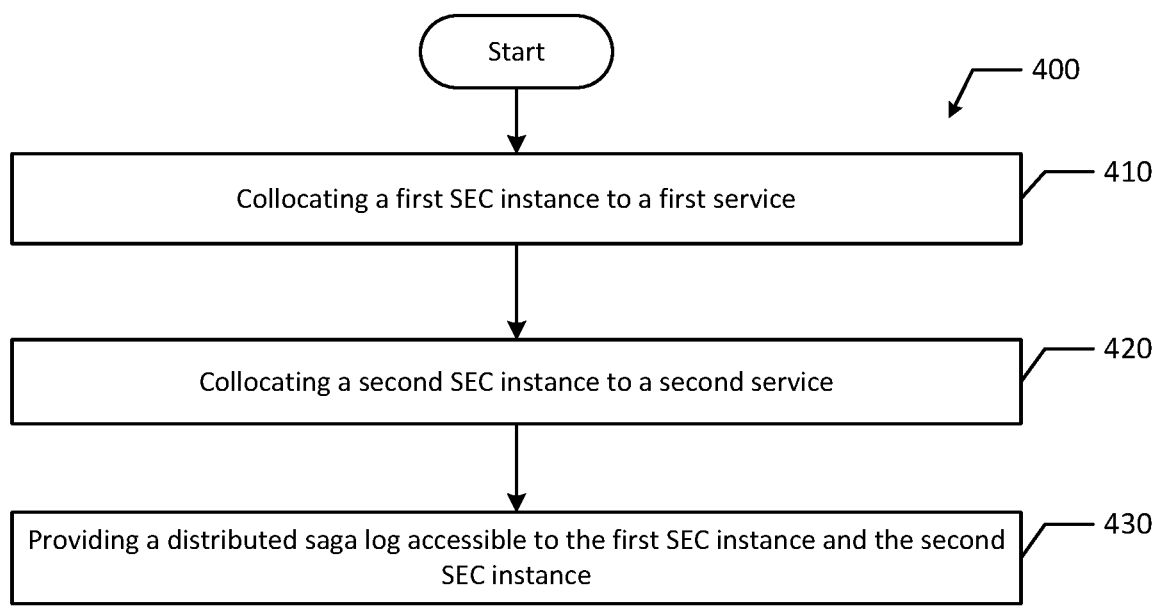
FIG. 4 illustrates a flowchart of an example process for distributed saga execution and coordination according to an example embodiment of the present disclosure.

FIG. 4 illustrates a flowchart of an example method 400 for distributed saga execution and coordination. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example method 400 includes collocating a first SEC instance to a first service (block 410). For example, SEC 202A may be collocated to service 294A. In an example, the service 294A may be a microservice. The SEC 202A may also be associated with a data adapter 204. Additionally, method 400 includes collocating a second SEC instance to a second service (block 420). For example, SEC 202B may be collocated to service 294B. In an example, the service 294B may be a microservice. The SEC 202B may also be associated with a data adapter 204. Method 400 also includes providing a distributed saga log accessible to the first SEC instance and the second SEC instance (block 430). For example, a distributed saga log 160 may be provided that is accessible to SEC 202A and SEC 202B. In an example, data adapters 204 may be configured to enable communication between SECs 202A-B and the distributed saga log 160.

Figure 5:
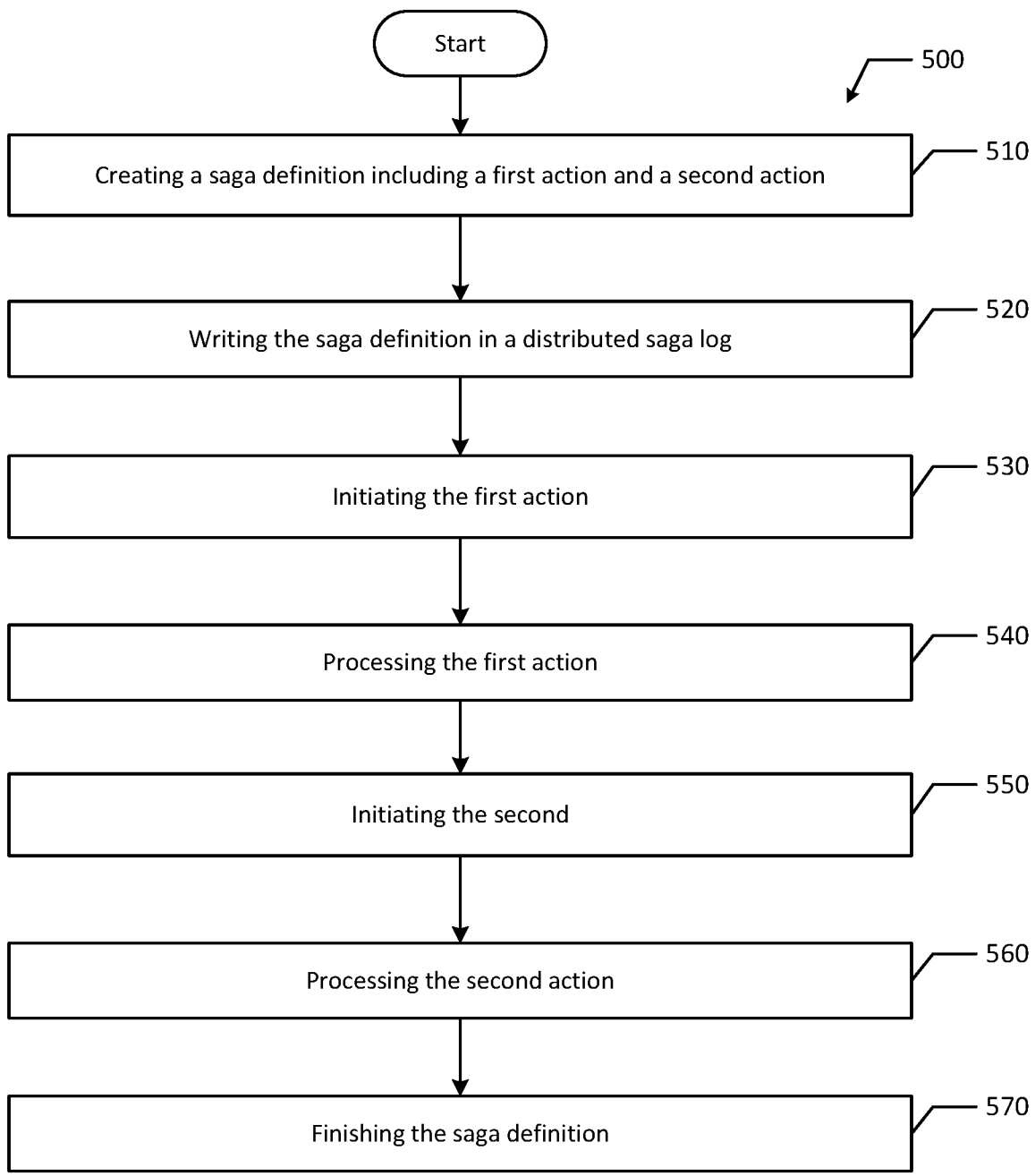
FIG. 5 illustrates a flowchart of an example process for completing a transaction through distributed saga execution and coordination according to an example embodiment of the present disclosure.

FIG. 5 illustrates a flowchart of an example method 500 for completing a transaction through distributed saga execution and coordination. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. The method 500 may be performed by processing logic that may comprise hardware (circuitry, dedicated logic, etc.), software, or a combination of both.

The example method 500 includes creating a saga definition including a first action and a second action (block 510). For example, a SEC (e.g., SEC 202A) may create the saga definition 310. In an example, the saga definition 310 may include one or more actions 312. Each action may be associated with a specific service 294. In another example, actions may be associated with multiple services 294 (e.g., different services 294 or different service instances may take and process a specific action 312). Method 500 also includes writing the saga definition in a distributed saga log (block 520). For example, the SEC 202A may write the saga definition 310 in the distributed saga log 160. In an example, the distributed saga log 160 may be a database 180. Then, method 500 includes initiating the first action (block 530). The SEC 202A may initiate the first action 312A, for example, by accessing the distributed saga log 160 and taking responsibility for action 312A. In an example, the SEC 202A may update the distributed saga log 160 with participant invocation information to indicate that action 312A has been assigned to service 294A. Additionally, method 500 includes processing the first action (block 540). For example, SEC 202A may process action 312A. In an example, after the first action 312A has processed, SEC 202A may update the distributed saga log 160 with participant invocation completion information to indicate that action 312A was successfully processed.

Method 500 includes initiating the second action (block 550). The SEC 202B may initiate the second action 312B, for example, by accessing the distributed saga log 160 and taking responsibility for action 312B. In an example, the SEC 202B may update the distributed saga log 160 with participant invocation information to indicate that action 312B has been assigned to service 294B. Additionally, method 500 includes processing the second action (block 560). For example, SEC 202B may process action 312B. In an example, after the first action has processed, SEC 202B may update the distributed saga log 160 with participant invocation completion information to indicate that action 312B was successfully processed. Then, method 500 includes finishing the saga definition (block 570). For example, one of SEC 202A-B may finish the saga definition 310. In an example, after each of the first action 312A and the second action 312B have been processed, either of the SECs 202A-B may update the distributed saga log 160 with saga completion information to indicate that the saga definition 310 was successfully completed. In some cases, the last SEC 202 to access the distributed saga log 160 may finish the saga definition 310. For example, when updating the distributed saga log 160 with its participant invocation completion information, the SEC 202 may realize that the other actions 312 have also been completed and may finish the saga definition 310.

FIGS. 6A, 6B, 6C and 6D illustrates a flowchart of an example method 600 for completing a transaction through distributed saga execution and coordination. Although the example method 600 is described with reference to the flowchart illustrated in FIGS. 6A, 6B, 6C and 6D it will be appreciated that many other methods of performing the acts associated with the method 600 may be used. For example, the order of some of the blocks may be changed, certain blocks may be combined with other blocks, blocks may be repeated, and some of the blocks described are optional. For example, services 294A-C (e.g., an airline service 294A, a hotel service 294B, and a car service 294C) and distributed saga log 160 may communicate to perform example method 600.

In the illustrated example, an airline service 294A (e.g., an airline service or "Service_A") may create a saga definition 310 that includes three actions 312A-C (e.g., book flight, book hotel and book car) (block 602). For example, a travel booking site or an airline website may initiate the creating of the saga definition 310. Then, the airline service 294A may write the saga definition 310 into the distributed saga log 160 (block 604). The saga definition 310 may be written to the distributed saga log 160 in order to start the transaction. The definition 310 is written into the distributed saga log 160 with the three actions 312A-C (block 606). It should be appreciated that sage definitions with more actions 312 may be processed by the present disclosure and that the present example is for illustrative purposes only. Additionally, several saga definitions 310 may be written into the distributed saga log 160 that involve the same services 294 or different services.

After the definition 310 is written into the distributed saga log 160, the distributed saga log 160 provides a first action 312A (e.g., a booking flight action) to the airline service 294A, provides a second action 312B (e.g., a booking hotel action) to the hotel service 294B and provides a third action 312C to the car service 294C (blocks 608 to 614). For example, assignments may be based on service availability or service abilities (e.g., assigning a "booking flight" action to an airline service instead of a hotel service). Then, the airline service 294A receives a "start saga" and a "start booking flight" message from the distributed saga log 160 (block 616). Similarly, the hotel service receives a "start booking hotel" message from the distributed saga log 160 (block 618). Additionally, the car service 294C receives a "start booking car" message from the distributed saga log 160 (block 620). In another example, the services 294A-C may poll the distributed saga log 160 for new actions waiting to be processed and may assign themselves to specific actions defined by the saga definition 310.

In the illustrated example, the airline service 294A is the first service to access the distributed saga log. However, it should be appreciated that the hotel service 294B or the car service 294C could also be instructed to start the saga and be the first services to access the distributed saga log 160. The airline service 294A accesses the distributed saga log 160 and indicates that the airline service 294A (e.g., "Service_A") is processing the book flight action (blocks 622 and 624). Then, the distributed saga log 160 indicates that the airline service 294A is processing the book flight action (block 626). For example, the distributed saga log 160 may be updated with participant invocation information to indicate that service 294A is processing the first action 312A to book a flight. As discussed above, locks may be used to ensure that only the airline service 294A or its collocated SEC is updating the activity in the distributed saga log 160. Then, the airline service 294A completes the first action 312A (e.g., the book flight action) (block 628). After completing the first action 312A, the distributed saga log 160 may indicate that the first action 312A has been completed by the airline service 294A (block 630). For example, after completing the first action 312A, the SEC 202 collocated with the airline service 294A may update the distributed saga log 160 with participant invocation completion information to indicate that the airline service 294A successfully booked the flight.

Figure 6A:
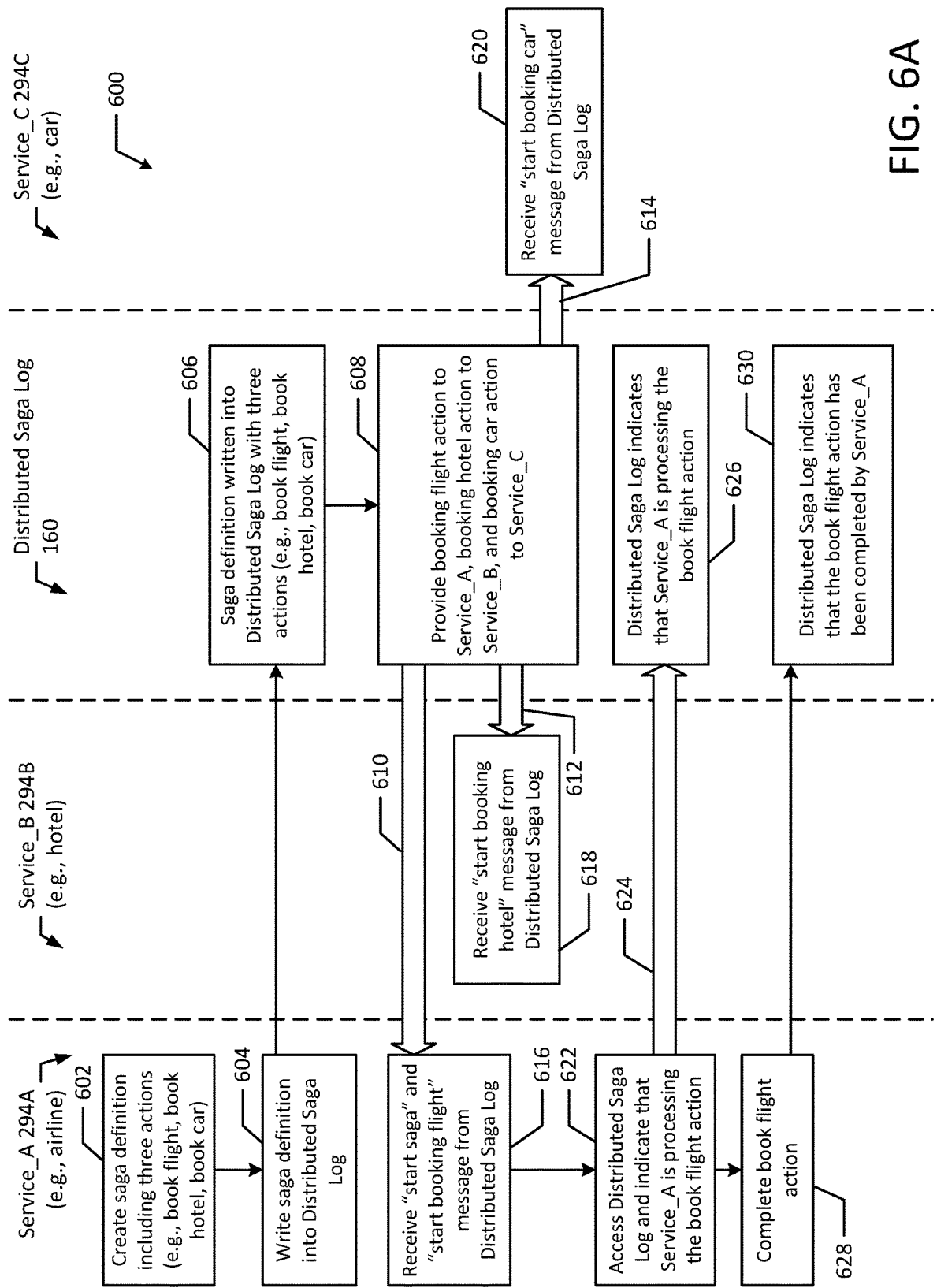
FIGS. 6A, 6B, 6C and 6D illustrate a flow diagram of an example process for completing a transaction through distributed saga execution and coordination according to an example embodiment of the present disclosure.
Figure 6B:
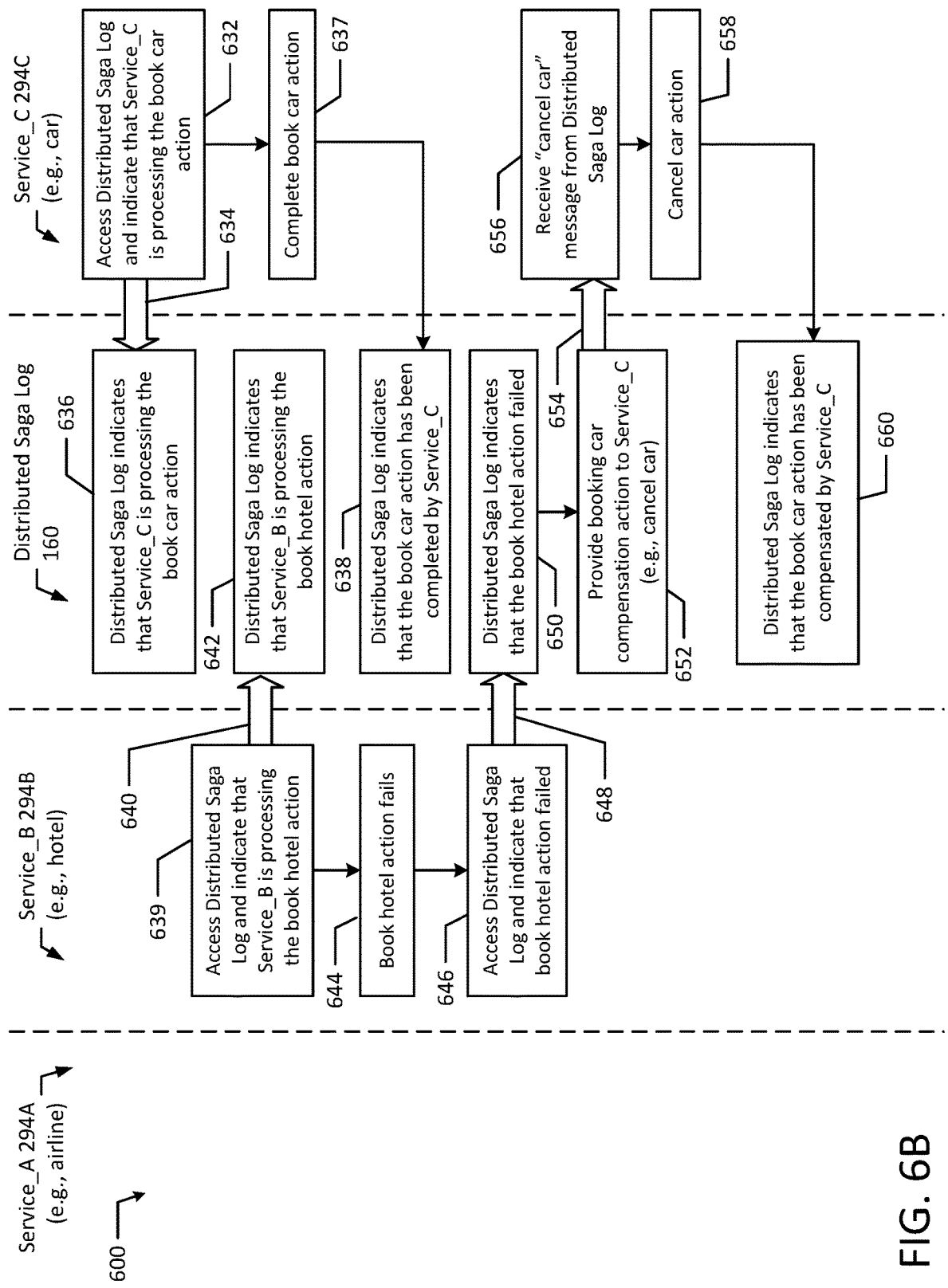

Continuing on FIG. 6B, the car service 294C accesses the distributed saga log 160 and indicates that the car service 294C (e.g., "Service_C") is processing the third action 312C (e.g., book car) (blocks 632 and 634). Then, the distributed saga log 160 indicates that the car service 294C is processing the third action 312C (block 636). The car service 294C completes the third action 312C and successfully books the car (block 637). After the car service 294C completes the third action 312C, the distributed saga log 160 indicates that the third action (e.g., the book car action) has been completed by the car service 294C (block 638). For example, after completing the third action 312C, the SEC 202 collocated with the car service 294C may update the distributed saga log 160 with participant invocation completion information to indicate that the car service 294C successfully booked the car.

The actions illustrated in FIGS. 6A-6D may be occurring consecutively, in parallel, or in a different order. For example, services 294 may be processing different activities in parallel with each other.

Additionally, the hotel service 294B may access the distributed saga log 160 and indicate that the hotel service 294B is processing the second action 312B (e.g., the book hotel action) (blocks 639 and 640). Then, the distributed saga log 160 indicates that the hotel service 294B is processing the second action 312B (block 642). However, in the illustrated example, the second action 312B (e.g., the book hotel action) fails (block 644). Then, the hotel service 294B accesses the distributed saga log 160 and indicates that the second action failed (blocks 646 and 648). Then, the distributed saga log 160 is updated to indicate that the second action 312B failed (block 650). For example, after failing to complete the second action 312B, the SEC 202 collocated with the hotel service 294B may update the distributed saga log 160 with participant invocation failure information to indicate that the hotel service 294B failed to book the hotel. Additionally, the entire saga definition 310 may be marked for compensation and each SEC 202 may poll the saga distribution log 160 and perform their respective compensation activities.

Because one of the actions failed, the distributed saga log 160 provides messages or compensation instructions to the services (e.g., 294A and 294C) that already completed their actions (e.g., actions 312A and 312C). For example, the distributed saga log 160 provides a "booking car compensation" action to the car service 294C (e.g., to cancel the car reservation) (blocks 652 and 654). The car service 294C receives the "cancel car" message from the distributed saga log 160 (block 656). Then, the car service 294C cancels the car action (block 658). After canceling the car action, the distributed saga log 160 indicates that the third action 312C has been compensated by the car service 294C (block 660). For example, after canceling the third action 312C, the SEC 202 collocated with the car service 294C may update the distributed saga log 160 with participant compensation information to indicate that the car service 294C canceled the car reservation.

Figure 6C:
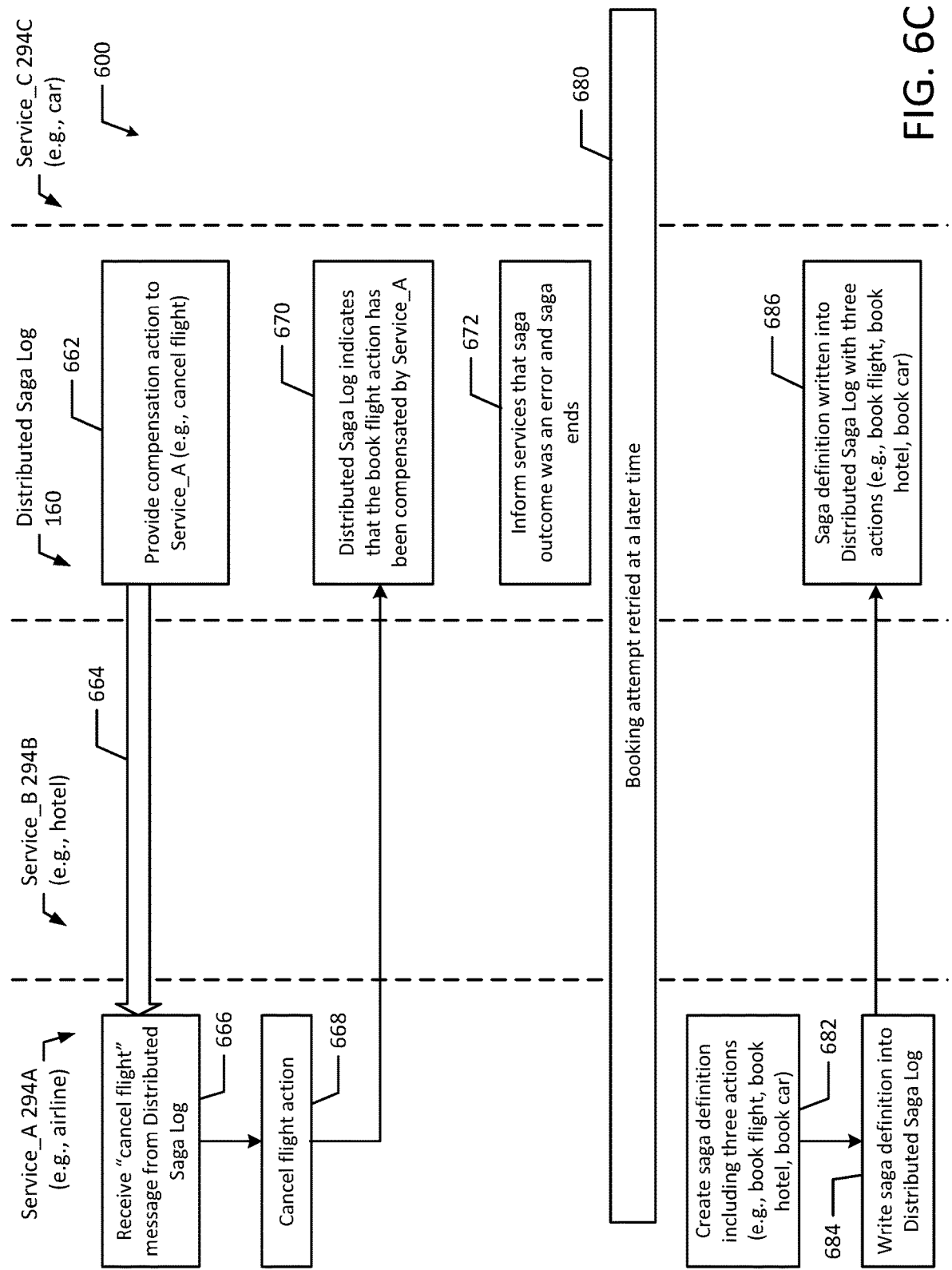
Figure 6D:
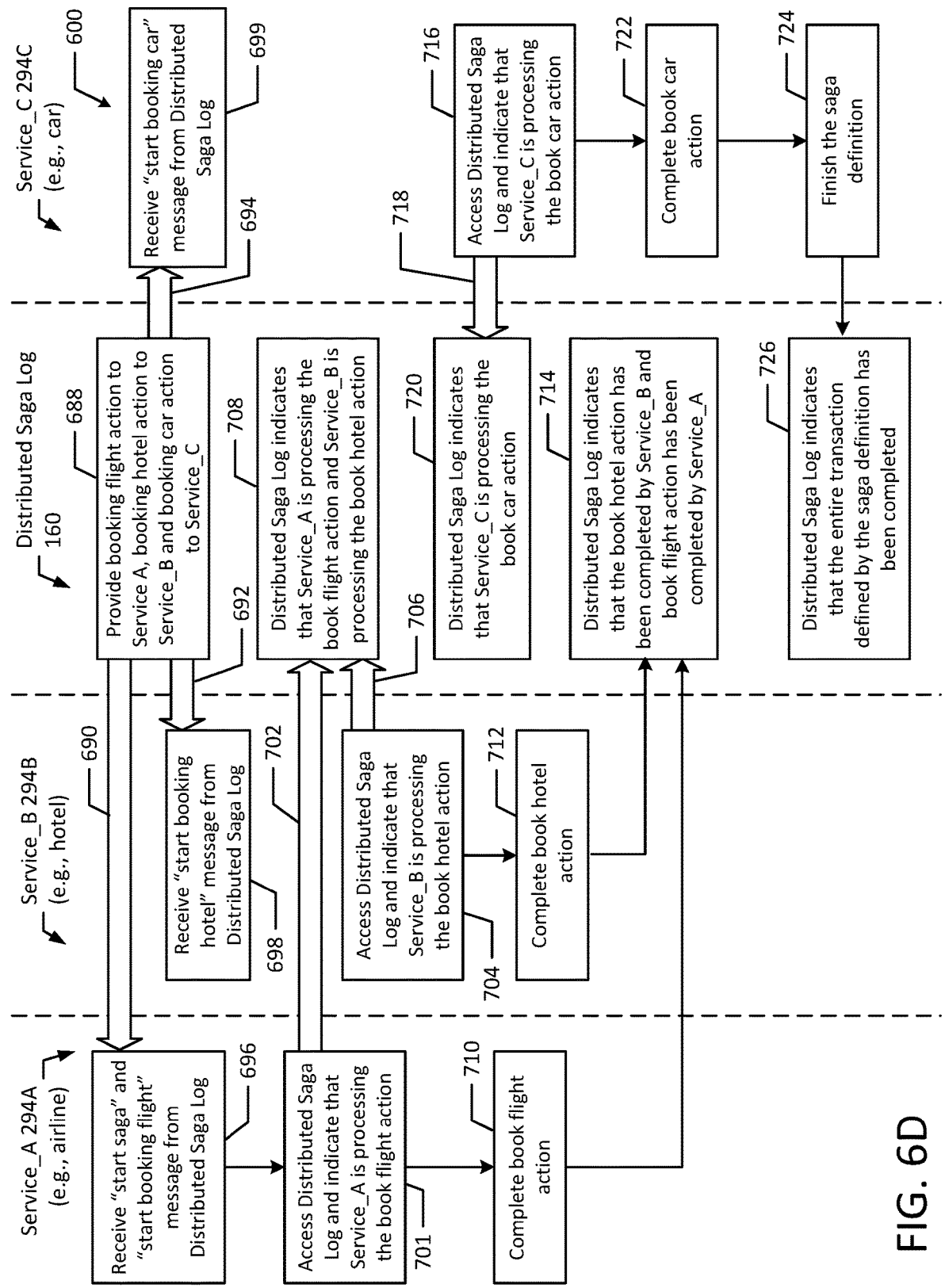

Additionally, continuing on FIG. 6C, the distributed saga log 160 provides a "booking flight compensation" action to the airline service 294A (e.g., to cancel the flight reservation) (blocks 662 and 664). Then, the airline service receives the "cancel flight" message from the distributed saga log 160 (block 666). The airline service 294A cancels the first action 312A (e.g., cancels the flight reservation) (block 668). After canceling the first action 312A (e.g., the flight reservation), the distributed saga log 160 indicates that the first action 312A has been compensated by the airline service 294A (block 670). For example, after canceling the first action 312A, the SEC 202 collocated with the airline service 294A may update the distributed saga log 160 with saga compensation information to indicate that the airline service 294A canceled the flight reservation. Then, the distributed saga log 160 may inform the services 294A-C that the saga outcome was an error and the saga ends (block 672).

Once all the appropriate actions have been compensated, the booking attempt may be retried again (e.g., at a later time) (block 680). The airline service 294A may create a saga definition 310 that includes three actions 312A-C (e.g., book flight, book hotel and book car) (block 682). The airline service 294A may create a new saga definition 310 or may reuse the previously created saga definition 310. In another example, a different instance of the airline service 294A may create the saga definition 310. For example, there may be multiple instances of each of the services 294A-C. Additionally, a different service (e.g., the car service 294C or the hotel service 294B may create the saga definition 310).

Then, the airline service 294A writes the saga definition 310 into the distributed saga log 160 (block 684). The definition 310 is written into the distributed saga log 160 with the three actions 312A-C (block 686). Continuing on FIG. 6D, after the definition 310 is written into the distributed saga log 160, the distributed saga log 160 provides a first action 312A (e.g., a booking flight action) to the airline service 294A, provides a second action 312B (e.g., a booking hotel action) to the hotel service 294B and provides a third action 312C to the car service 294C (blocks 688 to 694). Then, the airline service 294A receives a "start saga" and a "start booking flight" message from the distributed saga log 160 (block 696). Similarly, the hotel service 294B receives a "start booking hotel" message from the distributed saga log 160 (block 698). Additionally, the car service 294C receives a "start booking car" message from the distributed saga log 160 (block 699).

The airline service 294A accesses the distributed saga log 160 and indicate that the airline service 294A is processing the book flight action (blocks 701 and 702). Then, the distributed saga log 160 indicates that the airline service 294A is processing the book flight action (block 708). Additionally, the hotel service 294B accesses the distributed saga log 160 and indicates that the hotel service 294B is processing the book hotel action (blocks 704 and 706). As discussed above, the distributed saga log 160, or more specifically a saga definition 310 may be accessed by a single service or collocated SEC at a time. In another example, each action 312 of the saga definition 310 may only be accessed by a single service 294 or associated SEC 202 at a time to ensure consistency and accuracy of information between participants. After the airline service 294A and the hotel service 294B indicate that the book flight action and the book hotel action are in process, the distributed saga log 160 indicates that the airline service is processing the book flight action and the hotel service is processing the book hotel action (block 708). For example, the distributed saga log 160 may be updated with participant invocation information to indicate that service 294A is processing the first action 312A to book a flight and that service 294B is processing the second action 312B to book a hotel.

Then, the airline service 294A completes the first action 312A (e.g., the book flight action) (block 710). Additionally, the hotel service 294B completes the second action 312B and successfully books the hotel (block 712). After completing the respective first action 312A and second action 312B, the distributed saga log 160 may indicate that the first action 312A has been completed by the airline service 294A and the second action has been completed by the hotel service 294B (block 714). For example, after completing the first action 312A, the SEC 202 collocated with the airline service 294A may update the distributed saga log 160 with participant invocation completion information to indicate that the airline service 294A successfully booked the flight. Similarly, after completing the second action 312B, the SEC 202 collocated with the hotel service 294B may update the distributed saga log 160 with participant invocation completion information to indicate that the hotel service 294B successfully booked the hotel. As discussed above, services 294 and/or SEC(s) 202 may be prevented from accessing one of the distributed saga log 160, the saga definition 310 or a specific action 312 while another service 294 and/or SEC 202 is currently accessing the distributed saga log 160, the saga definition 310 or a specific action 312.

Restricting access to the entire distributed saga log 160 provides the most security, however, multiple saga definitions 310 involving hundreds of actions 312 may be stored on the distributed saga log 160. By restricting access to each action 312, the systems and methods disclosed herein advantageously enables multiple transactions to be processed consecutively and efficiently while insuring information accuracy between participants.

Then, the car service 294C accesses the distributed saga log 160 and indicates that the car service is processing the third action 312C (blocks 716 and 718). The distributed saga log indicates that the car service 294C is processing the third action 312C (block 720). After taking responsibility for the third action 312C, the car service 294C successfully completes the third action 312C (block 722). In the illustrated example, each action 312A-C has been successfully completed. The car service 294C may finish the saga definition (block 724). After the car service 294C completes the saga definition 310, the distributed saga log 160 indicates that the entire transaction defined by the saga definition 310 has been completed (block 726).

Figure 7:
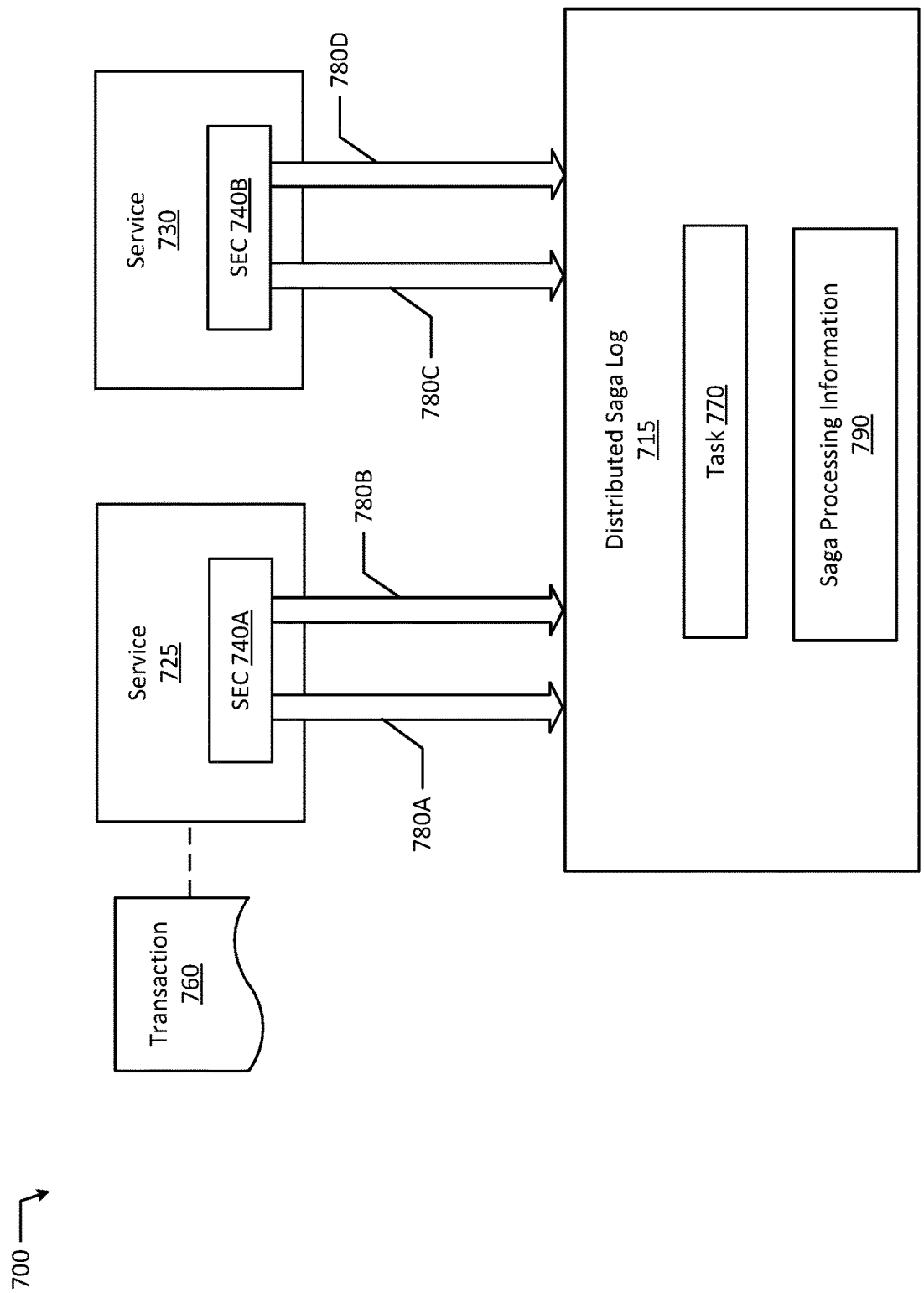
FIG. 7 illustrates a block diagram of an example distributed saga execution coordinator system according to an example embodiment of the present disclosure.

FIG. 7 is a block diagram of an example distributed saga execution coordinator system 700 according to an example embodiment of the present disclosure. The system 700 includes a distributed saga log 715, a first service 725, a second service 730, a first SEC instance 740A collocated to the first service 725, and a second SEC instance 740B collocated to the second service 730. The first SEC instance 740A is configured to manage a transaction 760 for the first service 725, access the distributed saga log 715, perform a task 770 identified in the distributed saga log 715, and document actions 780A-B initiated by the first SEC instance 740A in the distributed saga log 715. The distributed saga log 715 is accessible to the first SEC instance 740A and the second SEC instance 740B. Additionally, the distributed saga log 715 is configured to maintain saga processing information 790 associated with the actions 780A-B initiated by the first SEC instance 740A and the actions 780C-D initiated by the second SEC instance 740B.

By distributing and dissemination the SEC instances 740A-B over each service 725, 730, the SEC instances 740A-B provide self-saga capable services 725, 730 which can scale according to system demands without the single point of failure in traditional saga systems. For example, if a container or service fails, another SEC instance may continue to process saga transactions.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a distributed saga log, a first service, a second service, a first saga execution coordinator (SEC) instance collocated to the first service, and a second SEC instance collocated to the second service. The first SEC instance is configured to manage a transaction for the first service, access the distributed saga log, perform a task identified in the distributed saga log, and document actions initiated by the first SEC instance in the distributed saga log. The distributed saga log is accessible to the first SEC instance and the second SEC instance. Additionally, the distributed saga log is configured to maintain saga processing information associated with the actions initiated by the first SEC instance and the actions initiated by the second SEC instance.

In a 2nd exemplary aspect of the present disclosure, which may be used in combination with any one or more of the preceding aspects (e.g., the 1st aspect), the first service is configured to pack dependencies of the first instance of the SEC at runtime to collocate the first SEC instance to the first service.

In a 3rd exemplary aspect of the present disclosure, which may be used in combination with any one or more of the preceding aspects (e.g., the 1st aspect), the second SEC instance is configured to manage a different transaction for the second service, access the distributed saga log, perform a different task identified in the distributed saga log, and document actions initiated by the second SEC instance in the distributed saga log.

In a 4th exemplary aspect of the present disclosure, which may be used in combination with any one or more of the preceding aspects (e.g., the 1st aspect), the system further includes a third service and a third SEC instance collocated to the third service.

In a 5th exemplary aspect of the present disclosure, which may be used in combination with any one or more of the preceding aspects (e.g., the 1st aspect), the first SEC instance is a transaction library.

In a 6th exemplary aspect of the present disclosure, which may be used in combination with any one or more of the preceding aspects (e.g., the 1st aspect), saga processing information includes starting saga information, participant invocation information, participant invocation completion information, participant invocation failure information, saga completion information, saga compensation information, ending saga information or a combination thereof.

In a 7th exemplary aspect of the present disclosure, which may be used in combination with any one or more of the preceding aspects (e.g., the 1st aspect), the first SEC instance is configured to perform the task identified in the distributed saga log based on a task criteria.

In an 8th exemplary aspect of the present disclosure, which may be used in combination with any one or more of the preceding aspects (e.g., the 7th aspect), the task criteria includes a location of the service associated with the task.

In a 9th exemplary aspect of the present disclosure, which may be used in combination with any one or more of the preceding aspects (e.g., the 1st aspect), the system further includes a first data adapter and a second data adapter. The first data adapter is configured to provide data transfer between the distributed saga log and the first SEC instance. The second data adapter is configured to transfer data between the distributed saga log and the second SEC instance.

In a 10th exemplary aspect of the present disclosure, which may be used in combination with any one or more of the preceding aspects (e.g., the 1st aspect), the distributed saga log is represented by a database.

In an 11th exemplary aspect of the present disclosure, which may be used in combination with any one or more of the preceding aspects (e.g., the 10th aspect), the database is an event store.

In a 12th exemplary aspect of the present disclosure, which may be used in combination with any one or more of the preceding aspects (e.g., the 1st aspect), the distributed saga log is configured to restrict access to a first task identified in the distributed saga log by the second SEC instance when the first SEC instance is accessing the first task identified in the distributed saga log.

In a 13th exemplary aspect of the present disclosure, which may be used in combination with any one or more of the preceding aspects (e.g., the 1st aspect), the first service is one of a plurality of first service instances.

Aspects of the subject matter described herein may be useful alone or in combination with one or more other aspects described herein. In a 14th exemplary aspect of the present disclosure, a method includes collocating a first saga execution coordinator (SEC) instance to a first service, collocating a second SEC instance to a second service, and providing a distributed saga log that is accessible to the first SEC instance and the second SEC instance.

In a 15th exemplary aspect of the present disclosure, which may be used in combination with any one or more of the preceding aspects (e.g., the 14th aspect), the first SEC instance is a transaction library.

In a 16th exemplary aspect of the present disclosure, which may be used in combination with any one or more of the preceding aspects (e.g., the 14th aspect), the method further includes connecting the first SEC instance to the distributed saga log through a first data adapter, and connecting the second SEC instance to the distributed saga log through a second data adapter.

In a 17th exemplary aspect of the present disclosure, which may be used in combination with any one or more of the preceding aspects (e.g., the 14th aspect), collocating the first SEC instance to the first service includes packing dependencies of the first instance of the SEC at runtime of the first service.

Aspects of the subject matter described herein may be useful alone or in combination with one or more other aspects described herein. In an 18th exemplary aspect of the present disclosure, a system includes a distributed saga log, a first service, a second service, a first saga execution coordinator (SEC) instance collocated to the first service, and a second SEC instance collocated to the second service. The first SEC instance is configured to create a saga definition including a first action and a second action, write the saga definition in the distributed saga log, initiate the first action, and process the first action. The second SEC instance is configured to initiate the second action, process the second action, and finish the saga definition.

In a 19th exemplary aspect of the present disclosure, which may be used in combination with any one or more of the preceding aspects (e.g., the 18th aspect), the first SEC instance and the second SEC instance are transaction libraries.

In a 20th exemplary aspect of the present disclosure, which may be used in combination with any one or more of the preceding aspects (e.g., the 18th aspect), the first SEC is further configured to access the distributed saga log prior to initiating the first action, and indicate in the distributed saga log that the first action has been invoked by the first SEC instance.

In a 21st exemplary aspect of the present disclosure, which may be used in combination with any one or more of the preceding aspects (e.g., the 18th aspect), the first SEC instance is configured to initiate the first action identified in the distributed saga log based on a task criteria.

In a 22nd exemplary aspect of the present disclosure, which may be used in combination with any one or more of the preceding aspects (e.g., the 21st aspect), the task criteria includes a location of the service associated with the task.

In a 23rd exemplary aspect of the present disclosure, which may be used in combination with any one or more of the preceding aspects (e.g., the 18th aspect), the system further includes a first data adapter and a second data adapter. The first data adapter is configured to provide data transfer between the distributed saga log and the first SEC instance. Additionally, the second data adapter is configured to transfer data between the distributed saga log and the second SEC instance.

Aspects of the subject matter described herein may be useful alone or in combination with one or more other aspects described herein. In a 24th exemplary aspect of the present disclosure, a method includes creating, by a first saga execution coordinator (SEC) instance, a saga definition including a first action and a second action. The method also includes writing, by the first SEC coordinator, the saga definition in a distributed saga log. Additionally, the method includes initiating and processing, by the first SEC instance, the first action. The method also includes initiating and processing, by the second SEC instance, the second action. Additionally, the method includes finishing, by one of the first SEC instance and the second SEC instance, the saga definition.

In a 25th exemplary aspect of the present disclosure, which may be used in combination with any one or more of the preceding aspects (e.g., the 24th aspect), the first SEC instance and the second SEC instance are transaction libraries.

In a 26th exemplary aspect of the present disclosure, which may be used in combination with any one or more of the preceding aspects (e.g., the 24th aspect), the distributed saga log is configured to maintain saga processing information which includes starting information, participant invocation information, participant completion information, participant failure information, saga completion information, saga compensation information, ending saga information or a combination thereof.

In a 27th exemplary aspect of the present disclosure, which may be used in combination with any one or more of the preceding aspects (e.g., the 24th aspect), the first SEC instance initiates the first action based on a task criteria.

In a 28th exemplary aspect of the present disclosure, which may be used in combination with any one or more of the preceding aspects (e.g., the 27th aspect), the task criteria includes a location of the service associated with the task.

Aspects of the subject matter described herein may be useful alone or in combination with one or more other aspects described herein. In a 29th exemplary aspect of the present disclosure, a non-transitory machine readable medium stores code, which when executed by a processor, is configured to create a saga definition including a first action and a second action, write the saga definition in a distributed saga log, initiate the first action, process the first action, initiate the second action, process the second action and finish the saga definition.

Aspects of the subject matter described herein may be useful alone or in combination with one or more other aspects described herein. In a 30th exemplary aspect of the present disclosure, a system includes a first means for collocating a first saga execution coordinator (SEC) instance to a first service, a second means for collocating a second SEC instance to a second service, and a means for providing a distributed saga log that is accessible to the first SEC instance and the second SEC instance.

Aspects of the subject matter described herein may be useful alone or in combination with one or more other aspects described herein. In a 31st exemplary aspect of the present disclosure, a system includes a means for creating, by a first saga execution coordinator (SEC) instance, a saga definition including a first action and a second action. The system also includes a means for writing, by the first SEC coordinator, the saga definition in a distributed saga log. Additionally, the system includes a first means for initiating and a first means for processing, by the first SEC instance, the first action. The system also includes a second means for initiating and a second means for processing, by the second SEC instance, the second action. The system also includes a means for finishing, by one of the first SEC instance and the second SEC instance, the saga definition.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without dimin- The invention is claimed as follows:

1. A system comprising:
a distributed saga log;
a first service;
a second service;
a first saga execution coordinator (SEC) instance collocated to the first service;
a second SEC instance collocated to the second service, wherein the first SEC instance is configured to:
manage a transaction for the first service,
access the distributed saga log,
perform a task identified in the distributed saga log, and
document actions initiated by the first SEC instance in the distributed saga log, wherein the distributed saga log is accessible to the first SEC instance and the second SEC instance, and wherein the distributed saga log is configured to maintain saga processing information associated with the actions initiated by the first SEC instance and the actions initiated by the second SEC instance.

2. The system of claim 1, wherein the first service is configured to pack dependencies of the first instance of the SEC at runtime to collocate the first SEC instance to the first service.

3. The system of claim 1, wherein the second SEC instance is configured to:
manage a different transaction for the second service,
access the distributed saga log,
perform a different task identified in the distributed saga log, and document actions initiated by the second SEC instance in the distributed saga log.

4. The system of claim 1, further comprising a third service and a third SEC instance collocated to the third service.

5. The system of claim 1, wherein the first SEC instance is a transaction library.

6. The system of claim 1, wherein saga processing information includes at least one of starting saga information, participant invocation information, participant invocation completion information, participant invocation failure information, saga completion information, saga compensation information, and ending saga information.

7. The system of claim 1, wherein the first SEC instance is configured to perform the task identified in the distributed saga log based on a task criteria.

8. The system of claim 7, wherein the task criteria includes a location of the service associated with the task.

9. The system of claim 1, further comprising:
a first data adapter, wherein the first data adapter is configured to provide data transfer between the distributed saga log and the first SEC instance; and
a second data adapter, wherein the second data adapter is configured to transfer data between the distributed saga log and the second SEC instance.

10. The system of claim 1, wherein the distributed saga log is represented by a database.

11. The system of claim 10, wherein the database is an event store.

12. The system of claim 1, wherein the distributed saga log is configured to restrict access to a first task identified in the distributed saga log by the second SEC instance when the first SEC instance is accessing the first task identified in the distributed saga log.

13. The system of claim 1, wherein the first service is one of a plurality of first service instances.

14. A method comprising:
collocating a first saga execution coordinator (SEC) instance to a first service;
collocating a second SEC instance to a second service; and
providing a distributed saga log that is accessible to the first SEC instance and the second SEC instance.

15. The method of claim 14, wherein the first SEC instance is a transaction library.

16. The method of claim 14, further comprising:
connecting the first SEC instance to the distributed saga log through a first data adapter; and
connecting the second SEC instance to the distributed saga log through a second data adapter.

17. The method of claim 14, wherein collocating the first SEC instance to the first service includes packing dependencies of the first instance of the SEC at runtime of the first service.

* * * * *